Patented June 10, 1941

2,244,685

UNITED STATES PATENT OFFICE 2,244,685

PARAFFIN EMULSION

James H. Fritz, Bloomfield, and Ralph M. Beach, Newark, N. J., assignors to National Oil Products Company, Harrison, N. J., a corporation of New Jersey No Drawing. Application October 13, 1938
Serial No. 234,788

13 Claims. (Cl. 252—311)

The invention relates in general to emulsification and in particular to novel emulsifiers for paraffin wax and to correlated improvements in paraffin wax emulsions prepared by the use of such novel emulsifiers.

It is known that various water-insoluble substances such as animal, vegetable, mineral and synthetic resins, oils, waxes, pitches, gums, etc. find extended uses having greater advantages when such substances are rendered dispersible or emulsifiable in water. Many emulsifying agents have been proposed and used for emulsifying substances of the aforementioned type. While in certain cases the resulting emulsions or dispersions have been acceptable, the task of emulsifying paraffin wax has presented a unique and difficult problem in and of itself. Many of the well-known emulsifiers which ordinarily function well in the emulsification of water-immiscible substances have no emulsifying action on paraffin wax. While paraffin emulsions have been produced heretofore, they have been found to be highly unstable and non-uniform. The use of high speed colloidal mills has not resulted in a solution to the problem.

The general object of the invention is to obviate the foregoing and other disadvantages.

A specific object of the invention is to provide an improved paraffin wax emulsion which possesses high stability and uniformity.

A further object of the invention is to provide an improved emulsifier for paraffin wax.

Another object of the invention is to provide an improved paraffin emulsion which may be produced without the aid of homogenizing or like equipment.

An additional object of the invention is to provide an improved emulsifier which will emulsify many times its own weight of paraffin wax.

A further object of the invention is to provide an improved paraffin wax emulsion which remains stable within a wide concentration range.

Other objects will in part be obvious and will in part appear hereinafter.

According to the invention, there is provided a paraffin wax emulsifier comprising a soap, a fatty acid, an organic solvent and a saponifiable wax. The emulsifier is preferably produced by saponifying a fatty material with an alkali in the presence of an inert organic solvent. The higher fatty acid and the saponifiable wax are subsequently stirred into the soap-solvent mass in a molten or fluid condition. In the preparation of the paraffin wax emulsion of the invention, the foregoing emulsifier is admixed with paraffin wax in a warmed or molten condition whereby the resulting mass is readily dispersible in an aqueous medium by mere stirring.

The invention accordingly comprises a composition of matter possessing the characteristics, properties and the relation of constituents which will be exemplified in the composition hereinafter described and the scope of the invention will be indicated in the claims.

In the preparation of the emulsifier of the invention, any suitable soap may be employed. The fatty material, which is preferably saponified in the presence of an inert solvent, may be selected from a wide variety of substances including, among others, animal, vegetable and marine oils or liquid waxes, the higher fatty acids, esters, etc., as well as blown, hydrogenated or hydroxylated products of such and other fatty materials. As an illustration, the following fatty materials are included in the foregoing class: olive oil, cottonseed oil, palm oil, teaseed oil, rapeseed oil, cocoanut oil, rice bran oil, peanut oil, sesame oil, corn oil, soya bean oil, tallow, menhaden oil, cod oil, sardine oil, sperm oil, porpoise oil, etc., as well as the products obtained by hydrogenating, blowing or hydroxylating these and other oils and their corresponding fatty acids. The type of fatty material used should be selected according to the type of emulsion desired. For example, if an emulsion yielding a soft paraffin composition on deposition is required, a relatively low titre fatty material should be used; whereas if a harder product is desired, a high titre fat should be used as the hydrogenated products of fatty materials. The titre of the fat then controls the plasticity of the paraffin in the emulsion and the use to which the emulsion is to be put governs the aforementioned selection.

After selection of the fatty material or a suitable combination of two or more such materials, the fatty material is preferably dissolved or dispersed in a suitable inert solvent vehicle, such for example as diethylene glycol, diethylene glycol monoethyl ether, ethylene glycol monoethyl ether, etc. or mixture of these or other aliphatic alcohols containing from 3 to 6 carbon atoms, the use of diethylene glycol being preferred. As is well known, these solvents are either miscible with or soluble in both water and fatty materials such as fatty oils and soaps prepared therefrom; the term "mutual solvent for water and fatty materials" is employed in the claims to denote substances having these properties. Any suitable alkaline agent is added to the fatty material-solvent mass to effect saponification. Such agents include, inter alia, potassium hydroxide, sodium hydroxide, sodium carbonate, triethanolamine, etc., the use of potassium hydroxide being preferred. The amount of alkaline agent added should be substantially the stoichiometrical quantity necessary to completely saponify the fatty material. To insure complete saponification, an excess of alkaline agent may be used so that a small quantity of free alkali remains.

Upon completion of the foregoing saponification, the fatty acid and saponifiable wax are added separately or jointly. The fatty acid and wax may be warmed or melted together and stirred into the soap-solvent mass. The resulting mass, which is usually viscous or pasty in character constitutes the emulsifier of the invention. Any suitable fatty acid may be used, which is characterized by having a blending action between the soap and paraffin wax, such as palm fatty acids, oleic acid, linoleic acid, linolenic acid, stearic acid, etc. Again the choice as to titre should be made according to the degree of hardness desired in the final product. Any suitable animal, vegetable, mineral or synthetic wax may be used, such as candelilla, carnauba, montan, shellac wax, etc., these or similar partially saponifiable waxes being designated as "saponifiable waxes" to distinguish them from unsaponifiable waxes such as paraffin.

In preparing the novel emulsion of the invention, the foregoing emulsifier is admixed with warmed or molten paraffin wax to form an intimate and homogeneous mixture. The mass may then be admixed with the desired quantity of water to produce a stable and uniform paraffin emulsion of the desired concentration. The emulsifier-paraffin mass may, on the other hand, be allowed to cool, whereupon a pasty or solid mass results, depending upon the titre of the fatty materials used in producing the emulsifier. The pasty or solid paraffin emulsion will readily disperse upon admixture with water.

In the preferred embodiment, the emulsifier is produced by saponifying from about 35 to 50 parts by weight of a high titre fat with from about 14 to 20 parts of 48.8% aqueous potassium hydroxide in the presence of 10 to 20 parts of diethylene glycol, whereupon 10 to 20 parts of palm fatty acids and from 5 to 30 parts of candelilla wax are added. Such a product will properly emulsify up to 12 times its own weight of paraffin wax without the aid of a colloid mill or like equipment.

For a fuller understanding of the nature and objects of the invention, reference should be had to the following examples which are given merely to further illustrate the invention and are not to be construed in a limiting sense, all parts given being by weight:

Example I

To 39 parts of hydrogenated sardine oil in 13 parts of diethylene glycol there is added 15.5 parts of an aqueous solution of 48.8% potassium hydroxide. Upon completion of saponification a warmed mixture of 18.5 parts of palm fatty acids and 14 parts of candelilla wax is added to the resulting soap-solvent mixture. The resulting mass which is pasty in character constitutes one embodiment of the emulsifier of the invention which is capable of emulsifying up to 12 parts of its own weight of paraffin. An emulsion produced from 6 parts of paraffin and one part of the foregoing emulsifier yields an unusually stable and uniform emulsion by merely stirring this mixture with water. Such an emulsion may be diluted according to the concentration desired.

Example II

Forty-six parts of hydrogenated sperm oil in 13.5 parts of diethylene glycol are saponified by 11.3 parts of a 48.8% aqueous solution of potassium hydroxide. A mixture of 12.5 parts of palm fatty acids and 16.7 carnauba wax is then added to the saponified mixture to form another embodiment of the paraffin emulsifier of the invention.

Example III

To 42 parts of hydrogenated fish oil in 15 parts of diethylene glycol monoethyl ether there is added 16.7 parts of a 48.8% potassium hydroxide solution. To the resulting soap-solvent mass there is added 12 parts of montan wax and 14.3 parts of oleic acid whereby another embodiment of the emulsifier of the invention is produced.

Example IV

A still further embodiment of the paraffin emulsifier of the invention may be produced by saponifying 40 parts of castor oil with 14.8 parts of 48.8% potassium hydroxide in the presence of 15 parts of diethylene glycol. Upon completion of the reaction, 15 parts of oleic acid and 15.2 parts of shellac wax are admixed with the soap-solvent mass.

The emulsifier and the paraffin emulsion of the invention each have many uses in various industries. In the paper industry, for example, the emulsifier may be used in emulsifying the paraffin in wax paper "broke" during the process of reclaiming such "broke." In such a process waste waxed paper is disintegrated in warm or hot water to melt the paraffin and the emulsifier is then added to emulsify the paraffin. The emulsifier finds use in waxing paper by adding the same to a molten paraffin which is used in the production of wax paper. The paraffin emulsion produced from high titre fats is admirably suited for use as a paraffin size in the manufacture of wax sized and coated papers. A paraffin emulsion produced from the lower titre fats finds use as a softener in paper manufacture. The paraffin emulsions may be added to the paper stock either alone or in combination with other sizing materials or they may be coated on or impregnated into the wet or dry material after sheeting.

The paraffin emulsion may also be used in combination with insecticidal compositions with or without latex for use in spraying vegetation and fruits thereof. The solid form of the paraffin emulsion may be molded into small cakes and sold to laundries and housewives for addition to starch or other stiffening solutions to aid the ironing of fabrics. The solid paraffin emulsion will disperse in the starch or like solution and will provide the fabric with a superficial coating of paraffin, thereby preventing a hot iron from adhering to the fabric during the pressing operation. Moreover, the paraffin will serve to moistureproof the starch or other sizing whereby wilting of the fabric is retarded. The paraffin emulsion of the invention may also be used in the waterproofing and/or finishing of fabrics, leather and other materials and surfaces. The foregoing uses are merely illustrative, and it is obvious that the improved emulsion of the invention may be applied in any known manner. While the emulsifier of the invention is particularly suited for emulsifying paraffin, it is within the purview of the invention to use it for emulsifying or dispersing other water-immiscible materials.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that if desired, other materials may be added to our novel composition of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. An emulsifier comprising a water-soluble soap, substantial amounts of a higher fatty acid, a saponifiable wax, and a mutual solvent for water and fatty materials.
2. An emulsifier comprising a water-soluble soap, substantial amounts of a higher fatty acid, a saponifiable wax, and an aliphatic alcohol containing from 3 to 6 carbon atoms.
3. A paraffin emulsifier comprising a water-soluble soap of a high titre fat, substantial amounts of a higher fatty acid, a saponifiable wax, and an aliphatic alcohol containing from 3 to 6 carbon atoms.
4. A paraffin emulsifier comprising a water-soluble soap, substantial amounts of a higher fatty acid, a saponifiable wax, and diethylene glycol.
5. A paraffin emulsifier comprising a water-soluble soap, substantial amounts of palm fatty acids, candelilla wax, and diethylene glycol.
6. A paraffin emulsifier comprising a potassium soap, substantial amounts of palm fatty acids, candelilla wax, and diethylene glycol.
7. A paraffin emulsifier comprising a potassium soap, substantial amounts of oleic acid, shellac wax, and diethylene glycol.
8. An aqueous emulsion comprising paraffin wax, a water-soluble soap, substantial amounts of a higher fatty acid, a saponifiable wax, and a mutual solvent for water and fatty materials.
9. An aqueous emulsion comprising paraffin wax, a water-soluble soap, substantial amounts of a higher fatty acid, a saponifiable wax, and an aliphatic alcohol containing from 3 to 6 carbon atoms.
10. An aqueous emulsion comprising paraffin wax, a water-soluble soap of a high titre fat, substantial amounts of a higher fatty acid, a saponifiable wax, and an aliphatic alcohol containing from 3 to 6 carbon atoms.
11. An aqueous emulsion comprising paraffin wax, a water-soluble soap, substantial amounts of a higher fatty acid, a saponifiable wax, and diethylene glycol.
12. An aqueous emulsion comprising paraffin wax, a potassium soap, substantial amounts of palm fatty acids, candelilla wax, and diethylene glycol.
13. An aqueous emulsion comprising paraffin wax, a potassium soap, substantial amounts of oleic acid, shellac wax, and diethylene glycol.

JAMES H. FRITZ.
RALPH M. BEACH.